United States Patent [19]

Robinson

[11] Patent Number: 4,906,990
[45] Date of Patent: Mar. 6, 1990

[54] ANTI-G SYSTEM FAILURE DETECTION
[75] Inventor: Jon K. Robinson, Bellevue, Wash.
[73] Assignee: The Boeing Company, Seattle, Wash.
[21] Appl. No.: 313,596
[22] Filed: Feb. 21, 1989
[51] Int. Cl.4 .............................................. A61H 1/00
[52] U.S. Cl. ............................... 340/945; 128/204.23; 340/611; 600/20
[58] Field of Search ............... 340/945, 591, 611, 626; 128/204.22, 204.23, 204.29; 364/510, 558, 424.06, 434; 244/76 R, 226, 122 R; 600/19, 20; 297/284; 137/38

[56] References Cited
U.S. PATENT DOCUMENTS

3,572,331  3/1971  Kissen .................................. 340/611
3,691,521  9/1972  Schaefer ............................... 340/626
3,780,723 12/1973  Van Patten et al. .
3,792,426  2/1974  Ravenelle et al. .
3,956,772  5/1976  Cox .
4,336,590  1/1982  Jacq et al. .
4,534,338  8/1985  Crosbie et al. .
4,546,491 10/1985  Beaussant .
4,583,522  4/1986  Aronne .
4,638,791  1/1987  Krogh et al. .
4,736,731  4/1988  Van Patten ........................... 600/20
4,821,982  4/1989  Van Patten ........................... 364/434

Primary Examiner—Joseph A. Orsino
Assistant Examiner—Brent A. Swarthout
Attorney, Agent, or Firm—Seed and Berry

[57] ABSTRACT

A system and method for alerting a crew member if his anti-G system is not at the proper pressure during a flight. Flight condition sensors and an anti-G suit pressure sensor input data to a computer controller. The controller selects a pressure for protecting the crew member against blackout based on the input and data stored. The controller generates a signal to change the pressure in the anti-G suit to the selected pressure. The controller monitors the pressure status of the anti-G suit and rate of pressure change over time after the signal is generated. If the anti-G suit does not reach the selected pressure within a selected time, an alarm is provided to the crew member. Early warning, caution or failure alarms are generated if the suit does begin to inflate immediately or if it fails to reach a threshold pressure after a threshold time.

16 Claims, 3 Drawing Sheets

Input, Normal Acceleration (Analog), G

Figure 3

Input, Cabin Altitude Pressure (Analog), $P_{a_i}$

Figure 4

Input, Breathing System (Mask) Pressure, $P_{b_i}$

Figure 5

ANTI-G SYSTEM FAILURE DETECTION

This invention was made with Government support under Contract No. F33615-83-C-0651 awarded by the U.S. Air Force. The Government has certain rights in this invention.

TECHNICAL FIELD

This invention is related to systems for determining when an aircraft antigravity (anti-G) system is not operating properly, and more particularly, for determining when the anti-G suit is not inflated to the proper pressure during flight.

BACKGROUND OF THE INVENTION

Current high performance and high altitude aircraft, such as those currently used by the United States military, are capable of flight maneuvers that exceed the limits of the unprotected human body. In the event the acceleration rate exceeds the limit of the human body, the crew member becomes unconscious for a brief period of time because the blood leaves the brain and pools in the abdomen and lower extremities. The aircraft may also fly at altitudes above the safe limit for the human body.

Blacking out due to a high acceleration level is termed "G-induced loss of consciousness" (G-LOC). If G-LOC occurs at low altitudes or when the aircraft nose is pointing downward, the pilot may not regain consciousness prior to ground impact. To reduce the occurrence of G-LOC, crew members of current aircraft wear anti-G suits which apply pressure to the abdomen and lower extremities to restrict blood from pooling there and to reduce the loss of blood from the brain. Crew members also perform an M-1/L-1 straining maneuver to prevent the blood pressure in the brain from decreasing Recent aircraft have also included positive pressure breathing devices and chest counterpressure systems to further increase the crew's tolerances for G-forces and high altitude flight. At high altitudes, a full garment, the partial pressure suit, has been demonstrated to protect the human body from hypoxia, and eventual unconsciousness during flight.

The anti-G system, which includes the anti-G garments, positive pressure breathing and chest counterpressure devices and partial pressure suit are coupled to a source of fluid under pressure via a connector. When the pilot ejects from the aircraft, he carries with him the anti-G garment, which must be separated from the source of pressurized gas provided by the aircraft. In current aircraft, the connector which couples the anti-G system to the source of fluid under pressure provides pull-apart, quick-disconnect coupling to permit the pilot to cleanly and quickly eject from the aircraft.

The pull-apart connection between the anti-G suit and the source of pressurized fluid has been demonstrated to allow inadvertent and undetected disconnection during flight because of normal in-cockpit motion of the air crew. When the anti-G suit becomes disconnected from the source of pressurized fluid while in flight, the anti-G suit will not provide the required protection against unconsciousness. The crew member, unaware of the nonoperational state of his anti-G suit, may perform a high acceleration maneuver, causing G-LOC, or fly at high altitudes, causing hypoxia, and resulting in a possible fatality. Improvements in the pull-apart connector have resulted in new connectors that resist inadvertent separation; however, the resulting increase in complexity, bulk and weight makes them extremely difficult for use in a high performance aircraft. Further, some of the improved pull-apart or quick-disconnect designs which should separate only when the pilot is leaving the aircraft, either by ejection or after landing, have been demonstrated to fail and leave the pilot unprotected.

Systems for testing the operation of the anti-G suit at the factory and while on the ground just prior to each flight have been introduced to minimize the chance that the pilot will be left unprotected while in flight; see, for example, U.S. Pat. No. 4,336,590, to Jacq et al., incorporated herein by reference. Such test systems simulate various flight conditions, including accelerations and high altitudes, to test whether the entire system is working properly.

If the system does not work properly, an alarm is triggered. A significant disadvantage of the current systems is that they are not designed for operation while in flight. Prior to flight, the pressurization of the anti-G garment can follow a preselected test pattern because the aircraft has not yet left the ground. However, once the aircraft is airborne, a variety of different flight conditions will change the environment causing the pressure provided to the anti-G suit to vary constantly, the crew members may move, or the system may be damaged such as by a hit from an enemy, making use of a preset test pattern unreliable for suit status at a later time while in flight. Another disadvantage of current systems is that they use the same flight condition sensors and system for the test as is used during the flight. While using the same sensors and systems for test and actual in-flight anti-G suit protection provides the advantage of testing the components, it has the disadvantage that it temporarily disables the entire system and leaves the crew member unprotected during a test.

SUMMARY OF THE INVENTION

It is therefore an object of this invention to provide a system for indicating to the pilot when his anti-G system is not at the pressure required to protect him from flight conditions.

It is a further object of this invention to provide a method of alerting the pilot when his anti-G suit has become disconnected from the source of fluid under pressure.

It is a further object of this invention to provide a backup power supply for insuring that the controller and anti-G system operate properly even though the electrical power supply from the aircraft fails.

These and other objects of the invention are accomplished by monitoring the pressure status of an anti-G system at all times during the flight. The anti-G system is monitored and controlled by a computer controller. The controller receives inputs from various flight condition sensors and an anti-G suit fluid pressure sensor at all times throughout the flight. The controller selects a desired fluid pressure for the anti-G suit based on the flight sensor inputs received and using tables stored in a memory. The controller generates signals to control an electro-pneumatic valve for increasing or decreasing the pressure in the anti-G garment to cause pressure to equal the selected pressure.

The input data, including the suit pressure and flight conditions, are continuously updated to ensure that the data being used by the controller represents current aircraft flight and anti-G suit conditions. The controller continuously compares the pressure of the anti-G garment with the selected pressure for the then existing flight conditions, calculates he required pressure to provide the desired protection, and, in the event the pressure of the suit does not equal the required pressure, sends a command to the valve to vary the pressure in the suit. If the pressure in the suit fails to follow the commands of the controller within a specified time, an alarm is output to the crew member to warn him that the protection system is not operating properly. The rate of pressure change following a command to change the pressure is monitored in one embodiment to provide early warning to the pilot that his anti-G garment is not inflating at the proper rate.

DETAILED DESCRIPTION OF THE INVENTION

Figure 1:
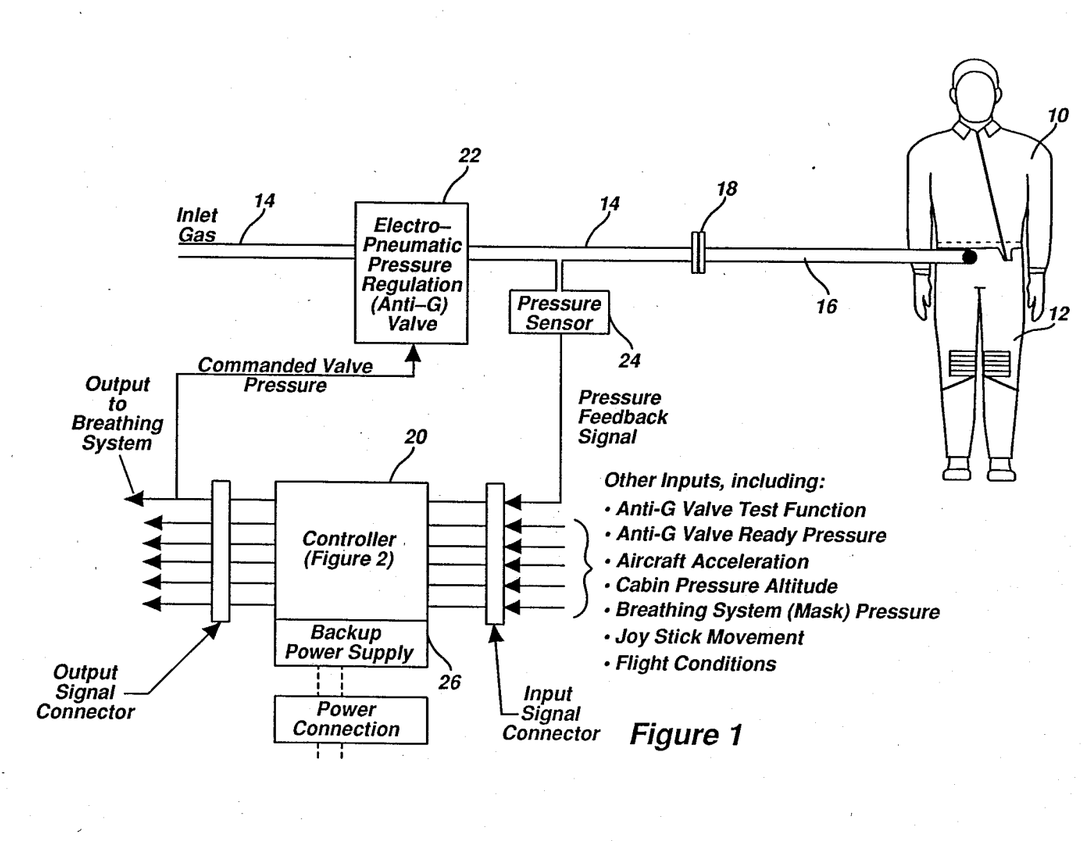
FIG. 1 is a schematic diagram of the anti-G garment system and anti-G failure detection system.

FIG. 1 illustrates the failure detection system and the anti-G system. A crew member 10 wears a lower garment anti-G suit 12 for protecting him from G-LOC. The hose 14 supplying the high pressure fluid is coupled to the hose 16 of the anti-G garment by a connector 18. The connector 18 is a quick-disconnect, pull-apart connector which is disconnectable by pulling on hose 16. If the pilot ejects, the hose 16 remains with the pilot and pulls apart from the hose 14 by separating at the pull-apart, quick-disconnect connector 18. Normal in-flight movement of the crew member may inadvertently cause the hose 16 to become disconnected from the hose 14 at connector 18, thus separating the crew member from the source high pressure fluid.

A controller 20 regulates an electro-pneumatic pressure valve 22 to provide the required pressure to the anti-G suit 12. A pressure sensor 24 coupled between the pressure regulation valve 22 and the anti-G suit 12 senses the pressure in the anti-G suit continuously. The anti-G suit pressure is provided continuously as an input to the controller 20. In the preferred embodiment, the pressure sensor 24 is integral in the housing with the pressure regulation valve 22 and is located between the valve and the suit. A suitable pressure sensor and valve combination is illustrated in U.S. Pat. No. 4,336,590, to Jacq et al., and also in U.S. Pat. No. 4,638,791, to Krogh et al., both incorporated herein by reference. Alternatively, the pressure sensor 24 may be located within the anti-G suit 12. However, having the pressure sensor 24 within the anti-G suit 12 tends to increase the complexity of the system and requires that the sensor be disconnectable from the pilot, which introduces a further possibility of error.

The aircraft acceleration, the cabin pressure altitude, and the breathing system mask pressure, joy stick movement, and other flight conditions are provided as inputs to the controller 20. The controller 20 may also receive manual inputs from the crew members such as an anti-G valve test function or an anti-G valve ready pressure command. Based on the inputs received, the controller 20 selects a desired pressure for the anti-G suit. The controller 20 compares the selected pressure with the current pressure of the anti-G suit as sensed by pressure sensor 24. If the current pressure is less than the selected pressure, the controller 20 opens the valve 22 to increase the pressure in the suit as is known in the art. A bleed valve (not shown) is opened to decrease the pressure in the suit if the pressure is greater than the selected value, as is known in the art. The controller continuously monitors the pressure in the anti-G suit, and compares the selected pressure at that instant with the sensed pressure and modifies the pressure in the suit as required.

The controller 20 determines acceptable positive and negative tolerance of error values for the difference between the selected pressure and the sensed pressure. An acceptable positive tolerance represents the value by which the pressure in the anti-G suit may exceed the selected value and still be considered sufficiently close to the selected value as to not require a caution, warning or other alarm to the crew member. An acceptable negative tolerance is that value to which the pressure may fall and still be considered sufficiently close to the selected pressure as to not require a failure caution, warning or other alarm to the crew member. The computer 20 calculates, based on stored information about each of the inputs, an acceptable positive and negative tolerance for each flight condition as sensed. The acceptable positive tolerance and acceptable negative tolerance may be different from each other even when based on the same flight conditions.

The controller calculates an error signal based on the difference between the pressure in the anti-G suit, as sensed by pressure sensor 24, and the selected pressure. The controller 20 compares the error signal to the positive tolerance value and the negative tolerance value calculated for those particular flight conditions during that moment in the flight.

If the error signal exceeds the accepted positive tolerance, an alarm signal is generated. Similarly, if the error signal exceeds the accepted negative tolerance, an alarm is generated. For a positive tolerance failure, the anti-G valve 22 may have failed in the open condition, creating a throughflow condition of the high pressure source of gas from the hose 14 to the anti-G garment 12. Alternatively, the pressure sensor 24 may have failed. If the error signal is only slightly greater than the acceptable positive tolerance, a caution signal is provided to the pilot indicating the potential for failure. In the event the error signal is significantly greater than the tolerance value the controller outputs a failure mode alarm signal indicating to the pilot that the anti-G garment system is considered failed.

If the error signal is less than the selected pressure by greater than the acceptable negative tolerance value, the controller outputs an alarm to the crew member. In the event the pressure is just slightly less than the acceptable negative tolerance value, a warning is generated and if the pressure is significantly less than the acceptable negative tolerance value, a failure alarm is generated. When the sensed pressure is lower than the selected pressure, the anti-G suit may have been disconnected during normal flight movements of the crew member. Alternatively, there may be a pressure leak in the anti-G suit, such as a ruptured bladder, a punctured hose or the like. Further, the anti-G valve may have failed closed, the source of inlet fluid to the anti-G valve 22 may have failed or the pressure sensor 24 may have failed. The appropriate caution or alarm is provided to the crew member to permit the crew member to check the other portions of his system and find the exact failure and correct the failure prior to engaging in a flight maneuver which may cause G-LOC and/or hypoxia.

The acceptable positive and negative tolerance values of the system are determined based on a combination of the tolerance of error for each component in the system. Sensed values can only be accurate to the accuracy of the instrument sensing the parameter. For example, the aircraft acceleration sensor has a specified tolerance associated with each value provided as an output. An output of 2.0 G's may not be exactly 2.0000 G's but some value in the range of 1.98 and 2.02 G's. The pressure sensor 24 also has an acceptable error in the output provided. An output of 5.0 may not be exactly 5.000 psi but some value near 5.0 psi, such as 5.001 psi or 4.993 psi. The altitude, cabin pressure and breathing system mask pressure similarly have acceptable tolerances from the value provided. The anti-G valve 22 operates mechanically within certain tolerance levels to provide the selected air pressure. Similarly, all other components of the system, including the mechanical, electrical and pneumatic components operate within certain tolerances.

The tolerances of error of each individual component may vary over the range of the respective component. Generally, sensors are rated by the manufacturer as accurate to within a certain percent of the value output, such as, plus or minus 2%. A pressure sensor 24 having an error of plus or minus 2%, has a possible error of 0.04 psi for a reading of 2 psi but for a reading of 10 psi the possible error is 0.2 psi. Alternatively, the pressure sensor may be rated by the manufacturer as accurate within a certain psi value, such as, for readings in the range of 4 psi to 8 psi, accurate to within 0.01 psi, for readings in the range of 0-4 psi accurate to within .02 psi and for readings in range of 8 to 12 psi, accurate within 0.03 psi or the like. Whether the error is provided as a percentage of the valve output or an absolute value for a given range, the error is usually different for different readings, depending on the sensor design.

As the tolerance of error for each component changes with its output, the controller recalculates the acceptable positive and negative tolerance values between the selected pressure and the sensed pressure based on how the values are affected by each particular component in the system. The tolerance of error over the entire range of operation for each sensor and component is stored in the memory of the controller. If the acceleration sensor is accurate to within 1%, the effect on the acceptable tolerance of error may be 1.5%, depending upon the pressure and flight parameters. Accuracy within 1% or 2% in the reading of sensor 24, when combined with the error of the flight condition sensor providing the input, such as the acceleration sensor, may translate into an acceptable tolerance of error of 1.5% to 3% for the entire system.

The selected pressure for the anti-G suit 12 will be constantly changing based on flight conditions. Sometimes, the anti-G suit is not pressurized at all or it may be at a very low pressure, only 1 or 2 psi. As the aircraft changes altitude and the cabin pressure changes, the pressure in the anti-G garment will also vary. Similarly, as the aircraft undergoes small changes in acceleration, the controller 20 receives the accelerations as an input and selects a desired pressure for the anti-G suit based on the aircraft accelerations. During normal flight conditions, the variations in pressure in the anti-G suit will be very small. However, the acceptable tolerances for the difference between the selected pressure and the sensed pressure may be made correspondingly small to ensure that the crew member is immediately alerted in the event of a degraded condition of his anti-G system. When the pilot changes altitude slightly or undergoes a small acceleration, neither of which are sufficiently great to cause a blackout, the controller nevertheless monitors the functioning of the anti-G system and alerts the pilot if the system is not operating properly. The pilot is thus alerted to not engage in a high acceleration or high altitude flight maneuver without checking all parts of the anti-G system to ensure that they are operating properly. The pilot is thus warned well in advance of engaging in a maneuver which places sufficient stress on his body to cause blackout.

The controller 20 is provided with a backup power supply 26. The backup power supply includes a battery of sufficient size to maintain operation of the electronic components of the anti-G system, controller 20, valve 22, and the like, if the main aircraft power fails. The battery may include a rechargeable battery on which a full battery charge is constantly maintained. The backup power supply 26 is mechanically coupled to the same housing which supports the controller 20 to minimize the risk that the electronic connection between them will be broken. The housing may of course be a simple circuit board, a metal enclosed box or the like. Alternatively, the backup power supply 26 may be part of an overall aircraft backup or emergency power supply located at an appropriate place in the aircraft separated from the housing of controller 20.

Figure 2:
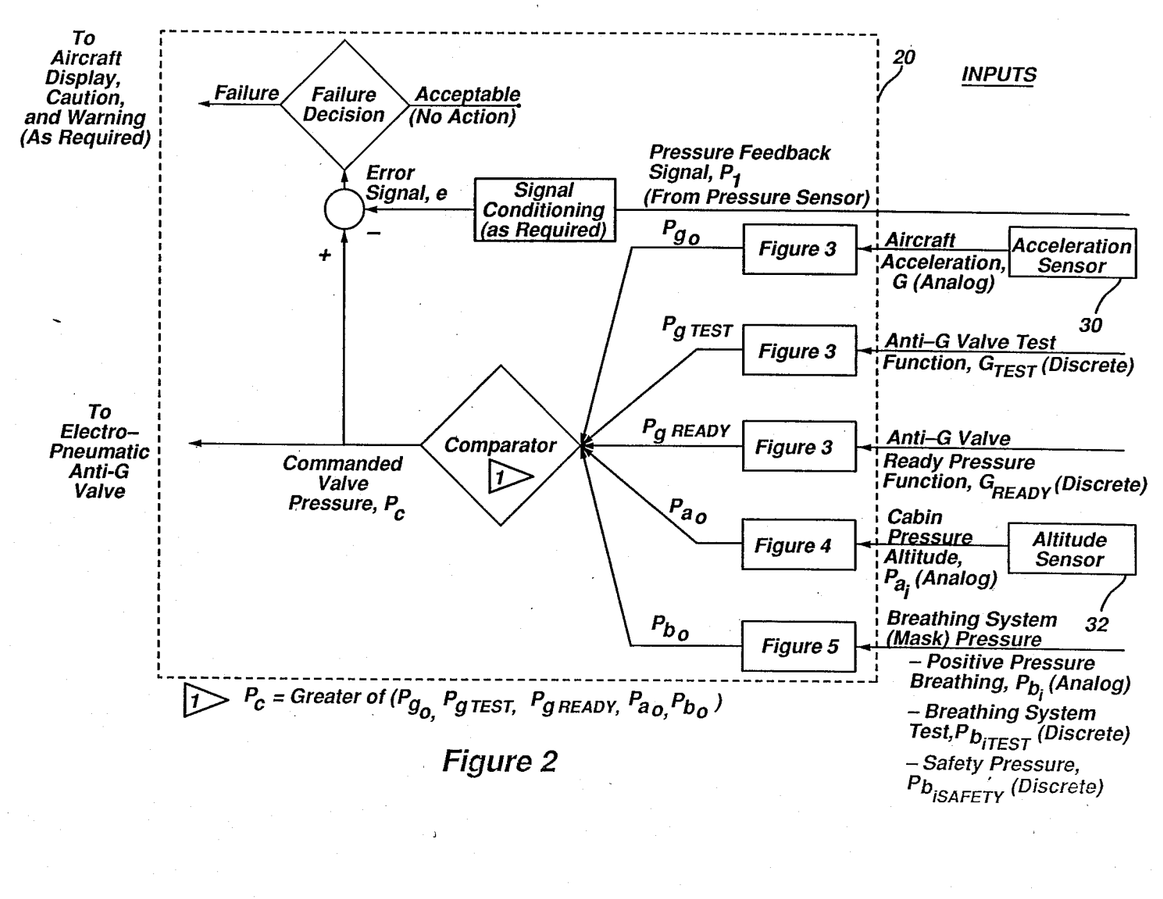
FIG. 2 is a block diagram of the controller operation.
Figure 3:
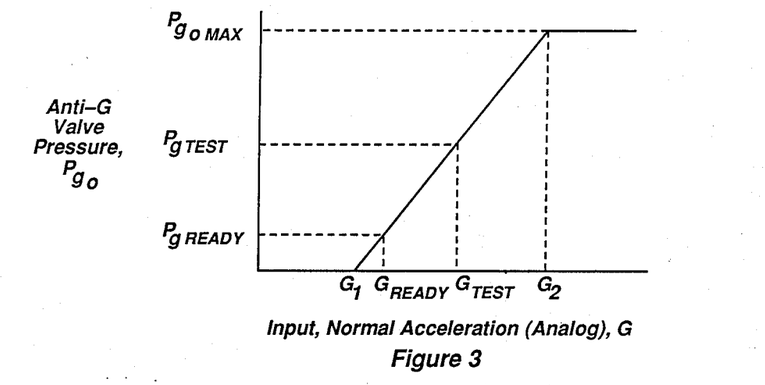
FIG. 3 is a graph of the anti-G garment pressure as a function of aircraft acceleration.
Figure 4:
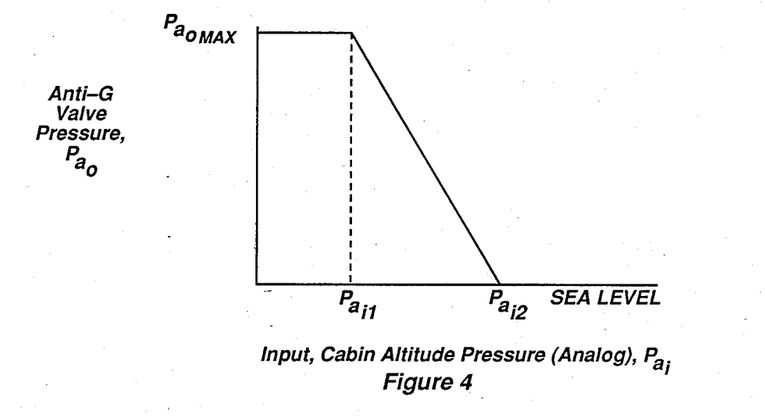
FIG. 4 is a graph of the anti-G garment pressure as a function of aircraft cabin altitude pressure.

FIG. 2 illustrates a block diagram for the operation of the controller 20. The controller 20 receives inputs from various flight condition systems. The controller 20 may receive an actual aircraft acceleration from an acceleration sensor 30. FIG. 3 illustrates a graph for the required pressure the anti-G suit based on inputs received from an acceleration sensor 30. The greater the input from the acceleration sensor, the higher the pressure of the anti-G suit. A maximum pressure is in the range of 10-12 psi. Alternatively, the pilot may place the anti-G suit in the ready condition, as may be done prior to entering a combat situation. The ready condition partially fills the bladders of the anti-G suit and maintains a ready pressure, generally 0-0.5 psi. A high pressure may rapidly be reached from the ready pressure position because the bladders are already inflated to close to their maximum size and any increase in the gas volume will result in increases in pressure. Alternatively, the pilot may perform an anti-G valve test function to pressurize the suit to a selected value while in flight As shown in the graph of FIG. 4, an anti-G suit pressure may also be selected based on altitude as sensed from an altitude sensor 32. As the altitude of the aircraft increases, the anti-G valve altitude pressure also increases. The maximum altitude pressure will be different from the maximum pressure which may be attained to compensate for aircraft accelerations. The pressure for the anti-G suit may also be selected based on the pressure in the breathing pressure mask as illustrated in the graph of FIG. 5.

Figure 5:
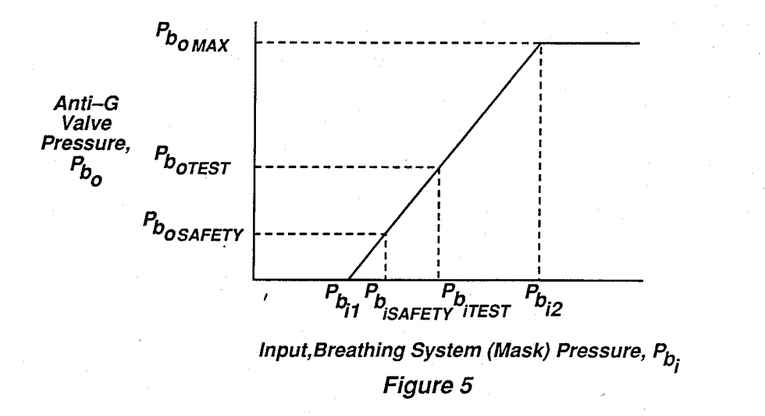
FIG. 5 is a graph of the anti-G garment pressure as a function of the breathing system mask pressure.

The controller 20 compares the various inputs with the tables stored in the permanent memory based on FIGS. 3, 4 and 5 and selects a desired anti-G suit pressure based on each respective input. The controller 20 then compares the selected anti-G suit pressure separately calculated for each of the respective inputs with each other and selects the higher pressure as the selected pressure at which the anti-G suit should be held. The controller 20 sends a command to the electro-pneumatic pressure regulation valve 22 to open an amount required for providing the selected pressure to the anti-G garment.

The controller 22 constantly monitors the actual pressure in the anti-G garment 12 as an input from pressure sensor 24. The controller 20 calculates an error signal equal to the difference between the sensed pressure and the selected pressure. If the error signal is within the acceptable positive and negative tolerance ranges for that particular flight condition, no action is taken. However, in the event the error signal exceeds the accepted tolerance range, either positive or negative, the appropriate caution, warning or alarm is provided to the crew member as previously described.

If the anti-G suit has not reached the selected pressure within a selected time, a failure mode alarm signal is generated. The time lag between when the controller 20 generates a signal to change the pressure in the anti-G suit 10 and when a change is sensed by pressure sensor 24 the time lag is measured and used to determine if the anti-G system is operating properly. The system must be given a permissible time to achieve the selected pressure, as the suit cannot inflate instantaneously. However, the time to reach the selected pressure must be short enough to provide the required protection for each flight condition.

The permissible time for the anti-G suit to achieve the selected pressure will vary considerably, based on the flight condition or manual input. For example, the crew member remains conscious for three or four seconds during a significant acceleration prior to blacking out. However, if anti-G system protection is not provided in the first two seconds, the crew member will likely black out. The suit must therefore inflate within one or two seconds to be considered operating properly if the flight condition requiring the pressure is an acceleration. For a different flight condition, such as high altitude flight, because the pilot is able to withstand a high altitude flight for several minutes before his physical and mental condition begins to degrade, the anti-G suit is not required to reach the selected pressure for several seconds. Additionally, the selected time to achieve a ready pressure may be 2 or 3 seconds whereas only 0.5 seconds may be permitted to achieve a test pressure.

The rate at which the suit is increasing in pressure to reach the selected pressure is also monitored. In one embodiment, the controller monitors changes in the anti-G suit pressure in timed stages beginning immediately after the signal to increase the pressure is generated to determine if the system is operating properly. If the anti-G suit pressure has not reached a selected percentage of the selected pressure after a short period of time, a caution or alarm is generated. For example, if the anti-G suit pressure does not increase to at least 25% of the selected pressure value after a threshold of time such as 50% of the time to full inflation has elapsed, a caution may be sounded to alert the crew member to his potentially unprotected condition. Alternatively, the pressure may be required to reach fifty percent of the selected value after a set time, such as one-half a second, has elapsed.

The threshold time is selected based on the time required to give the pilot sufficient time to react and stop the flight maneuver prior to G-LOC occurring. For an acceleration maneuver, the time will typically be less than one second. For an high altitude flight condition the time may be selected to be as low as 2 seconds or as great as 20 seconds. The anti-G suit may be given more or less time to react for different flight conditions.

The alarms are given in stages, based on pressure changes over time after the controller generates a signal to achieve a selected pressure. A first stage alarm, or early warning, is given immediately if the suit pressure remains constant and there is absolutely no change in suit towards the selected pressure. The early warning is based on fluid pressure changes just after the signal to change pressure is generated. The alarm indicates to the crew member that no change in pressure has occurred even though a change has been requested by the controller. The early warning is helpful to permit a crew member to start the M-1/L-1 straining maneuver immediately, check his suit and/or change flight conditions. An early warning is not given if the pressure begins immediately to change and approach the selected pressure.

A second stage alarm signal, or caution, is given after a threshold time has passed if the suit pressure has not reached a certain percent of the selected pressure at the threshold time. The threshold time is different for each flight condition. The threshold time is selected to leave just sufficient time for the crew member to change the flight condition to avoid the possibility of unconsciousness. For an acceleration the threshold time is in the range of 0.25 to 1.00 seconds after the signal generated and preferably is approximately 0.5 seconds. For other flight conditions, the threshold time is longer or shorter. If the suit pressure does reach the certain percentage of the final pressure within the threshold of time, a caution signal is not generated.

A third stage alarm signal or failure signal is given after a selected time has passed if the suit has not reached the final, selected pressure. The selected time is generally that time by which the suit must be inflated to ensure that the crew member does not become unconscious or suffer physical impairment. The failure signal indicates to the crew member that the pressure system has failed and he is left unprotected. The crew member can perform the M-1/L-1 straining maneuver to aid in retaining consciousness. The crew member may also quickly flip a switch to put the plane on automatic-pilot for a few moments until the crew member regains consciousness. Alternatively, the controller, simultaneously with generating the failure signal to the aircraft flight generates a signal to the aircraft flight control system to put the craft in a stable flight pattern or on auto-pilot for a few moments. The plane is thus automatically controlled and is assured of not crashing even though the pilot may blackout for a few moments.

The controller 20 sets an internal timer at an initial time, simultaneously with, or just prior to, transmitting the signal to the valve 20 for changing the fluid pressure in the suit. The controller 20 also stores in a memory the fluid pressure in the anti-G suit as sensed by sensor 24 at the initial time. The computer controller 20 monitors the fluid pressure in the anti-G suit at specific times after the initial time for each alarm stage. The timing program for monitoring the fluid pressure is stored in the computer for each flight condition, such as acceleration, high altitude flight, test functions, manual inputs, and the like using the guidelines previously discussed. The computer controller 20 also includes a program for comparing the sensed fluid pressure at any given time or at a time after the initial time with the selected fluid pressure or the fluid pressure value stored at the initial time. The controller determines the rate of pressure change, the pressure at any given time after the initial time and generates the appropriate signal to the crew member.

I Claim

1. A method of ensuring that a crew member's anti-G garment remains coupled to a high pressure fluid supply during flight, comprising the steps of:
   sensing an aircraft flight condition;
   selecting a fluid pressure for said anti-G garment to compensate for the effects of said flight condition on the blood flow of a crew member's body;
   generating a signal for controlling a valve means for providing said selected fluid pressure to said anti-G garment, said valve means being coupled between said high pressure fluid supply and said anti-G garment;
   sensing the fluid pressure in said anti-G garment at a selected time after generating said signal for controlling said valve;
   determining the difference between said sensed fluid pressure at said selected time and said selected fluid pressure for said flight condition;
   determining an acceptable tolerance of error in said difference between said sensed fluid pressure and said selected fluid pressure, said acceptable tolerance of error being determined based on said sensed flight condition;
   comparing said difference between said selected fluid pressure and said sensed fluid pressure to said acceptable tolerance of error; and
   providing as an output an alarm signal to alert a crew member if said difference between said selected fluid pressure and said sensed fluid pressure is greater than said acceptable tolerance of error at said selected time.

2. The method according to claim 1, after further including the steps of:
   maintaining a minimum selected pressure in said anti-G garment continuously during flight;
   sensing the fluid pressure in said anti-G garment continuously during the flight; and
   providing as output said alarm if said sensed pressure falls below said minimum selected pressure by greater than said tolerance of error at any time during the flight.

3. The method according to claim 1 wherein said flight condition is a manual input from a crew member.

4. The method according to claim further including the steps of:
   measuring the rate of change over time of said anti-G fluid pressure from an initial time just prior to generating said signal for controlling said valve to a second time, said second time being after generating said signal; and
   providing as an output said alarm signal to said crew member if said anti-G garment fluid pressure does not change at or above a threshold rate from said initial time to said second time.

5. The method according to claim 4 wherein the amount of time from said initial time to said second time is variable for different flight conditions.

6. The method according to claim 4 wherein an alarm is emitted if said anti-G garment fluid pressure does not reach a selected percentage of said selected fluid pressure within a selected percentage of an elapsed time after said initial time for a flight condition of acceleration.

7. The method according to claim 1, further including the steps of:
   measuring said anti-G suit fluid pressure at a initial time just prior to generating said signal;
   measuring said anti-G suit fluid pressure at a second time, said second time being after said signal is generated; and
   providing as an output an alarm signal to said crew member if said anti-G suit fluid pressure at said second time is less than a threshold value, said threshold value being a percentage said selected fluid pressure.

8. The method according to claim 7 wherein said second time is a selected percentage of the time between said initial time and said selected time and said threshold value is a selected percentage of said selected pressure.

9. The method according to claim 1, further including:
   providing power for performing said steps with a backup battery power supply if said aircraft main power fails.

10. An apparatus for ensuring that the anti-G garment of a crew member in an aircraft remains operational during flight, comprising:
    pressure sensor means for sensing an anti-G garment fluid pressure while said aircraft is flying;
    flight condition sensor means for sensing a flight condition of said aircraft;
    a pull-apart connector coupling a source of fluid pressure to said anti-G garment, said anti-G garment being separable from said source of fluid pressure at said pull-apart connector by pulling said fluid pressure source and said anti-G garment away from each other;
    electronic control means for selecting a fluid pressure to compensate for the effects of said flight condition on said crew member's body;
    valve means for selectively coupling a source of fluid under pressure to said anti-G garment;
    signal generation means for generating a signal to control said valve means sufficient to provide a selected fluid pressure to said anti-G garment;
    comparing means for comparing said anti-G garment fluid pressure with said selected fluid pressure;
    timing means for measuring said anti-G garment pressure at selected times and for measuring variations in said anti-G garment pressure over time; and
    alarm means for alerting said crew member if said sensed anti-G garment fluid pressure is not within a threshold value of said selected fluid pressure.

11. The apparatus according to claim 10, further including:
    storing means for storing a tolerance of error of said flight condition sensor means; and
    error tolerance means for determining an acceptable tolerance of error between said anti-G garment fluid pressure and said selected fluid pressure, based on said tolerance of error in said means for flight condition sensing means.

12. The apparatus according to claim 11 wherein said acceptable tolerance of error is different for different flight conditions.

13. The apparatus according to claim 10 wherein said pressure sensor means is coupled in said fluid pressure source, downstream of said valve means and upstream of said pull-apart connector.

14. The apparatus according to claim 11 wherein said electronic control means, said signal generation means, said timing means, said comparing means, said storing means and said error tolerance means are included in a single electronic controller means.

15. The apparatus according to claim 14, further including a backup power supply independent of said aircraft's main power supply for providing electric power to run said controller means.

16. The apparatus according to claim 15 wherein said backup power supply is mechanically coupled to a housing that supports said electronic controller means.

* * * * *

UNITED STATES PATENT AND TRADEMARK OFFICE
CERTIFICATE OF CORRECTION

PATENT NO. : 4,906,990

DATED : March 6, 1990

INVENTOR(S) : Jon K. Robinson

It is certified that error appears in the above-identified patent and that said Letters Patent is hereby corrected as shown below:

In claim 4, column 9, line 52, delete "claim further" and substitute therefor --claim 1, further--.

Signed and Sealed this

Eleventh Day of June, 1991

Attest:

HARRY F. MANBECK, JR.

Attesting Officer

Commissioner of Patents and Trademarks